United States Patent
Katoh et al.

(10) Patent No.: US 9,227,685 B2
(45) Date of Patent: Jan. 5, 2016

(54) VEHICLE

(71) Applicant: TOYOTA JIDOSHA KABUSHIKI KAISHA, Toyota-shi (JP)

(72) Inventors: Kohshi Katoh, Hadano (JP); Kuniaki Gotou, Nagoya (JP); Eishi Takeuchi, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/540,092

(22) Filed: Nov. 13, 2014

(65) Prior Publication Data

US 2015/0137472 A1    May 21, 2015

(30) Foreign Application Priority Data

Nov. 15, 2013    (JP) .................. 2013-237245

(51) Int. Cl.
*B62D 9/02* (2006.01)
*B62K 5/10* (2013.01)
*B62K 5/01* (2013.01)
*B62J 25/00* (2006.01)
*B62K 5/05* (2013.01)
*B62K 5/00* (2013.01)

(52) U.S. Cl.
CPC . *B62K 5/10* (2013.01); *B62J 25/00* (2013.01); *B62K 5/01* (2013.01); *B62K 5/05* (2013.01); *B62K 2005/001* (2013.01)

(58) Field of Classification Search
CPC ............ B62D 9/02; B62D 9/04; B60G 2/008; B60G 21/05; B62K 5/01; B62K 5/10; B62K 2005/001
See application file for complete search history.

(56) References Cited

U.S. PATENT DOCUMENTS

| | | | | |
|---|---|---|---|---|
| 4,546,997 | A | * 10/1985 | Smyers | 280/5.509 |
| 4,632,413 | A | * 12/1986 | Fujita et al. | 280/124.103 |
| 7,487,985 | B1 | * 2/2009 | Mighell | 280/124.103 |
| 8,128,110 | B2 | * 3/2012 | Sacli | 280/124.106 |
| 2007/0126199 | A1 | * 6/2007 | Peng et al. | 280/124.103 |
| 2007/0262548 | A1 | 11/2007 | Rawlinson | |
| 2008/0197597 | A1 | * 8/2008 | Moulene et al. | 280/124.103 |
| 2008/0258416 | A1 | * 10/2008 | Wilcox | 280/124.103 |
| 2009/0224524 | A1 | * 9/2009 | Rathsack | 280/778 |
| 2010/0044977 | A1 | * 2/2010 | Hughes et al. | 280/5.509 |
| 2015/0137468 | A1 | 5/2015 | Katoh et al. | |

FOREIGN PATENT DOCUMENTS

| | | |
|---|---|---|
| JP | S6234807 A | 2/1987 |
| JP | 2007508996 A | 4/2007 |
| JP | 2012-111305 A | 6/2012 |
| JP | 2015-096388 A | 5/2015 |

* cited by examiner

*Primary Examiner* — Paul N Dickson
*Assistant Examiner* — Robert A Coker
(74) *Attorney, Agent, or Firm* — Kenyon & Kenyon LLP

(57) ABSTRACT

Provided herein is a vehicle having high driving operability during turning. The vehicle having a right wheel provided at the right of a main body and a left wheel provided at the left of the main body, includes a right lower arm that connects the main body to the right wheel, a left lower arm that connects the main body to the left wheel, and foot placement sections that are respectively mounted to the right and left lower arms in order to place feet of a driver thereon. A mounting position of the right lower arm to the main body is to the left of the main body and a mounting position of the left lower arm to the main body is to the right of the main body.

2 Claims, 9 Drawing Sheets

VEHICLE

CROSS-REFERENCE TO RELATED APPLICATION

The present application claims priority to Japanese Patent Application No. 2013-237245 filed on Nov. 15, 2013, which is incorporated herein by reference in its entirety.

BACKGROUND OF THE INVENTION

1. Field of the Invention

The present invention relates to a vehicle.

2. Related Background Art

Conventionally, a vehicle in which a driver sits on a driver seat and performs a driving operation is known, for example, as disclosed in Japanese Unexamined Patent Application Publication No. 2012-111305. Such a vehicle includes a driver seat on which a driver sits, and the driver seat has a backrest section extending upward from the rear of a seat section directed in a horizontal direction. The driver sits on the driver seat, rests the driver's waist and back against the backrest section, stretches legs in a forward direction from the driver seat to take the seat, and performs a driving operation. That is, the driver drives the vehicle in a posture of putting feet ahead of the waist and knees and leaning the back against the backrest section.

Incidentally, in a vehicle in which a driver has a driving posture of sitting by straddling a seat sheet and leaning the driver's back against a backrest section as in a motorcycle, it is difficult to stabilize the driving posture. Particularly, a stable driving posture is required during turning or the like.

Accordingly, in the field of the present technique, it is desired to develop a vehicle having high driving operability during turning.

According to an aspect of the present invention, a vehicle is a vehicle having a right wheel provided at the right of a main body and a left wheel provided at the left of the main body, the vehicle includes a seating section configured such that an occupant is able to take a seat by straddling the same, a right arm member that connects the main body to the right wheel, a left arm member that connects the main body to the left wheel, and foot placement sections that are respectively mounted to the right and left arm members in order to place feet of the occupant thereon, wherein the main body is configured to be capable of being inclined to the left and the right with respect to the right and left arm members, and a mounting position of the right arm member to the main body is to the left of the main body from a mounting position of the left arm member to the main body.

According to the present invention, it is possible to provide a vehicle having high driving operability during turning.

DESCRIPTION OF THE PREFERRED EMBODIMENTS

Hereinafter, an embodiment of the present invention will be described in detail with reference to the accompanying drawings. In description of the drawings, like reference numerals refer to like components, and redundant description thereof will be omitted. In addition, in each drawing, a horizontal direction or a vehicle width direction is indicated by an x-direction, a forward and rearward direction or a traveling direction is indicated by a y-direction, and a vertical direction is indicated by a z-direction.

Figure 1:
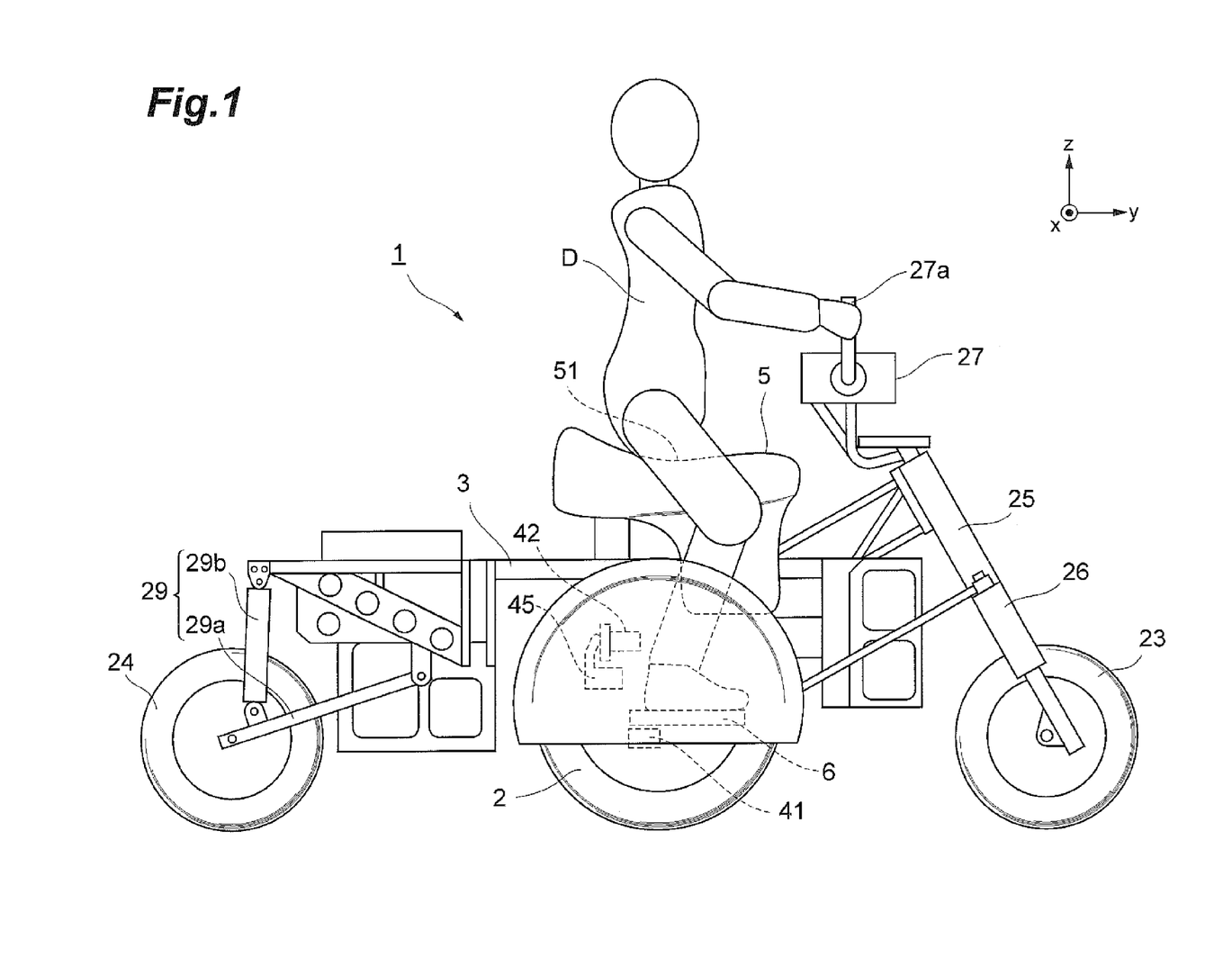
FIG. 1 is a view schematically illustrating a configuration of a vehicle according to an embodiment of the present invention.
Figure 2:
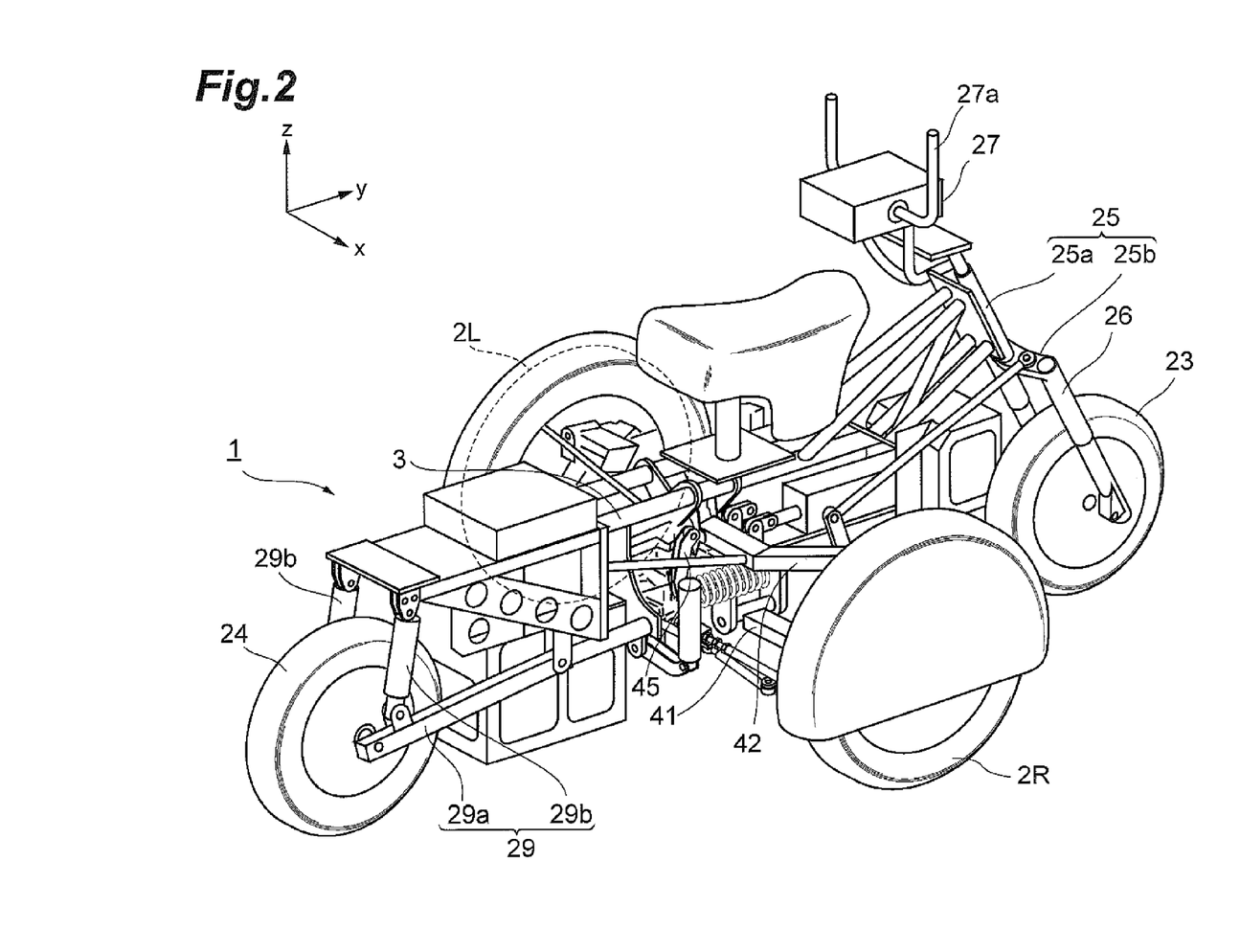
FIG. 2 is a perspective view illustrating the vehicle of FIG. 1.

FIG. 1 is a view schematically illustrating a configuration of a vehicle according to an embodiment of the present invention, FIG. 1 being a view when the vehicle is viewed from the side. FIG. 2 is a perspective view schematically illustrating the vehicle according to the embodiment.

A vehicle 1 according to the embodiment is a vehicle including a pair of right and left wheels 2R and 2L, travels in such a manner that a driver D boards the vehicle to perform a driving operation, and functions as a moving object, a traveling object, or a traveling vehicle. The right wheel 2R is provided at the right of a main body 3 of the vehicle 1 and the left wheel 2L is provided at the left of the main body 3. The driver D is an occupant boarding the vehicle 1. FIG. 1 shows only the right wheel 2R. In addition, although a case in which the vehicle is boarded by one occupant is described in the embodiment, the present invention may also be applied to a vehicle boarded by a plurality of occupants.

The right and left wheels 2R and 2L are mounted to the main body 3 through lower arms 41 and upper arms 42. The lower arms 41 and the upper arms 42 function as arm members which connect the main body 3 to the right and left wheels 2R and 2L. For example, the right and left wheels 2R and 2L function as side wheels or auxiliary wheels of the vehicle 1. The main body 3 is a vehicle body forming a main body portion of the vehicle 1. For example, the main body 3 has a long shape in the forward and rearward direction of the vehicle 1 and has a frame structure in which a plurality of rod-shaped members is joined to each other. In addition, the main body 3 may also have a structure other than the frame structure as long as the main body 3 is of a structure having stiffness capable of supporting the driver D boarding the vehicle. For example, the main body 3 may also be configured by combining a rod-shaped member, a plate-shaped member, a block-shaped member, etc. The right wheel 2R is mounted through the associated lower arm 41 and upper arm 42 which are provided so as to protrude to the right from the main body 3. The lower arm 41 and upper arm 42 connected to the right wheel 2R function as right arm members. Although not shown in FIG. 1, the left wheel 2L is also mounted through the associated lower arm 41 and upper arm 42 which are provided so as to protrude from the main body 3, similarly to the right wheel 2R. The lower arm 41 and upper arm 42 connected to the left wheel 2L function as left arm members. In addition, a mounting structure of the lower arm 41 and the upper arm 42 will be described in detail later.

A front wheel 23 and a rear wheel 24 are mounted to the main body 3. That is, the vehicle 1 includes four wheels consisting of the front wheel 23, the rear wheel 24, and the pair of right and left wheels 2R and 2L. The front wheel 23 is provided in front of a seating section 5 and the rear wheel 24 is provided behind the seating section 5. For example, the front wheel 23 is mounted to a front portion of the main body 3, the rear wheel 24 is mounted to a rear portion of the main body 3, and the right and left wheels 2R and 2L are respectively mounted to the right and the left of the main body 3 at a position between the front wheel 23 and the rear wheel 24. Although the right and left wheels 2R and 2L are shown to have a greater outer diameter than the front and rear wheels 23 and 24, the right and left wheels 2R and 2L may also have an outer diameter equal to or smaller than the front and rear wheels 23 and 24.

The front wheel 23 is mounted to the front portion of the main body 3 through a steering mechanism 25 and a suspension mechanism 26. The front wheel 23 functions as a steering wheel or a turning wheel of the vehicle 1. That is, the vehicle 1 turns to the right in such a manner that a forward portion of the front wheel 23 is directed from the front to the right when steering effort is transferred to the front wheel 23, and the vehicle 1 turns to the left in such a manner that the forward portion of the front wheel 23 is directed to the left when the steering effort is transferred to the front wheel 23.

The steering mechanism 25 is a mechanism for transferring steering effort to the front wheel 23, and for example, is configured such that a horizontal member 25b directed in the horizontal direction is mounted to a lower end of a steering shaft 25a. The steering shaft 25a is a shaft member arranged in the vertical direction and is rotatably mounted to the front portion of the main body 3. The suspension mechanism 26 is coupled to a lower portion of the steering mechanism 25. The suspension mechanism 26 has a shock-absorbing function while rotatably supporting the front wheel 23 as a wheel, and includes a spring, a shock absorber, and the like. For example, the suspension mechanism 26 is a telescopic fork type suspension mechanism, and is configured such that two shaft members having the spring and the shock absorber are arranged at the right and the left of the front wheel 23, respectively. The vehicle 1 is inclined forward by a lower side of the front fork type suspension mechanism 26 and the front wheel 23 is mounted to the suspension mechanism 26 with a positive caster angle. In addition, the steering mechanism 25 and the suspension mechanism 26 are not limited to the above-mentioned type, and other types may also be used as long as the steering effort is transferred to the front wheel 23 while the front wheel 23 is rotatably supported as a wheel.

The rear wheel 24 is mounted to the rear portion of the main body 3 through a suspension mechanism 29. The rear wheel 24 functions as a driving wheel of the vehicle 1. That is, the vehicle 1 travels by rotating the rear wheel 24 by means of rotary power transferred from a power source. For example, a motor is used as the power source. In addition, a power source other than the motor may also be used as the power source as long as the rear wheel 24 is driven. For example, an engine may also be used as the power source. In addition, a wheel-in motor provided within the rear wheel 24 may also be adopted. In addition, the front wheel 23 and the wheels 2 may also be used as a driving wheel, instead of the rear wheel 24.

The suspension mechanism 29 has a shock-absorbing function while rotatably supporting the rear wheel 24 as a wheel, and for example, is a swing arm type suspension mechanism including a swing arm 29a and a shock absorber 29b. The swing arm 29a is rotatably mounted at a lower position of the rear portion of the main body 3, and the rear wheel 24 is axially supported at a rear end of the swing arm 29a. The shock absorber 29b is rotatably mounted at an upper position of the rear portion of the main body 3, and a lower end thereof is rotatably mounted to a rear portion of the swing arm 29a. The shock absorber 29b has a built-in support spring member such as a spring. In addition, suspension mechanisms of other types may also be used as the suspension mechanism 29 as long as the rear wheel 24 is rotatably supported as a wheel. In addition, the vehicle 1 may also be configured without provision of one or both of the front wheel 23 and the rear wheel 24.

The seating section 5 is mounted to the main body 3. The seating section 5 is a seating section on which the driver D sits, and functions as a driver seat or a driving seat. The seating section 5 is at a central position of the main body 3 in the forward and rearward direction thereof, and is located at an upward position of the lower arm 41. In addition, the central position of the main body 3 also includes a nearly central position of the main body 3.

The seating section 5 is configured such that the driver D may take a seat by straddling the same. For example, a seating section having a shape or form such as a saddle used for horseback riding is used as the seating section 5, and the seating section 5 functions as a saddle member or a saddle section which stabilizes the seating of the driver D. The seating section 5 has a seat section 51 formed with a lateral width such that the driver D may lower left and right legs in a downward direction in a straddling state. For example, the seat section 51 is configured such that an upper surface thereof is recessed downward compared to other portions of the seating section 5. Thereby, a seating position of the driver D may be stabilized at a formation position of the seat section 51. In addition, in place of or in addition to such a recessed portion, one side or both sides of the front and the rear of the seat section 51 may also be provided with a portion protruding upward. Even in this case, the seating position of the driver D may be more stabilized so as not to shift from a position of the seat section 51.

As shown in FIG. 1, the vehicle 1 is provided with foot placement sections 6. The foot placement sections 6 are to place the feet of the seated driver D thereon. The foot placement sections 6 are located beneath the seating section 5 and respectively provided at left and right positions with the seating section 5 interposed therebetween. In other words, each of the foot placement sections 6 is located beneath the seating section 5 and provided at the same position as the seating section 5 in the forward and rearward direction of the vehicle 1. Here, the same position of the seating section 5 includes a nearly identical position. That is, the foot placement section 6 is provided at the same position as or the nearly identical position to the seating section 5 in the forward and rearward direction such that the head, the waist, and the foot of the driver D are positioned in a nearly straight line in the vertical direction when the driver D straddles the seating section 5 to place the foot on each foot placement sections 6. In this case, since the head, the waist, and the foot of the driver D are positioned in a nearly straight line in the vertical direction, a driving posture of the driver D is a horseback riding posture. In addition, FIG. 1 shows only a right foot placement section 6 of a pair of left and right foot placement sections 6 and 6.

The foot placement sections 6 are not mounted to the main body 3, but provided at lateral positions of the main body 3. That is, each of the foot placement sections 6 is mounted to the lower arm 41 which connects the right wheel 2R or the left wheel 2L to the main body 3. The lower arm 41 which connects the right wheel 2R to the main body 3 functions as a right arm member, and the lower arm 41 which connects the left wheel 2L to the main body 3 functions as a left arm member. Specifically, the foot placement section 6 is directly supported on the lower arm 41, or is indirectly supported through other member on the lower arm 41. Since the foot placement section 6 is mounted to the lower arm 41 located at the side of the main body 3, the main body 3 may be easily inclined in an opposite lateral direction in such a manner that the driver D keeps or kicks the foot placed on the foot placement section 6. For this reason, a turning operation of the vehicle 1 is easily performed by the inclination of the main body 3.

The vehicle 1 is provided with a centering mechanism 45. The centering mechanism 45 is a mechanism which assists the main body 3 to be changed from a state inclined to either the left or the right to an erected state. The centering mechanism 45 is located beneath the seating section 5 and disposed at a central side of the main body 3 across the left and right foot placement sections 6 and 6. The centering mechanism 45 adjusts the posture or angle of the main body 3 relative to each upper arm 42, thereby allowing the main body 3 to be in an erected state. For example, even when the main body 3 is in an erected state (see FIG. 5) or in an inclined state (see FIG. 6), the upper arm 42 is directed in the horizontal direction and the centering mechanism 45 may change the main body 3 from an inclined state to an erected state by adjusting the posture or angle of the main body 3 relative to the upper aim 42. That is, the centering mechanism 45 may assist the main body 3 to be changed from an inclined state to an erected state by rotating the main body 3 relative to the upper arm 42. In addition, the centering mechanism 45 may not also be installed.

The vehicle 1 is provided with an operation section 27. The operation section 27 is an operation section for a driving operation of the vehicle 1, and includes a grip section 27a gripped with a hand of the driver D. The grip section 27a is located in front of the seating section 5 and at an upward position of the seating section 5, and for example, is disposed at a position at which the driver D grips the grip section 27a in a state in which the driver D maintains a horseback riding posture in which the head, the waist, and the feet are positioned in a nearly straight line. The grip section 27a is a member which is gripped with the hand of the driver D to be operated and functions as a driving operation section of the vehicle 1. That is, an acceleration operation may be performed by tilting the grip section 27a in the forward direction and a deceleration operation may be performed by tilting the grip section 27a in the rearward direction. The grip section 27a is, for example, a vertical rod-shaped member, and includes two rod-shaped grip parts which may be respectively gripped with both hands of the driver D.

When the operation section 27 is integrally mounted to the main body 3, a steering operation of the vehicle 1 may not be performed by the operation section 27 and the grip section 27a, but a steering operation by turning of the front wheel 23 may be performed by integrally mounting the operation section 27 to the steering mechanisms 25 to rotate the operation section 27 or the grip section 27a to the left or the right. In addition, although a case in which the operation section 27 includes the vertical grip section 27a has been described in the embodiment, the grip section 27a may also be horizontally provided as in a handle of a bicycle or a motorcycle, or may also be provided as in a ring-shaped steering wheel such as a handle of a car. Specific structures of the operation section 27 and the grip section 27a will be described later.

Figure 3:
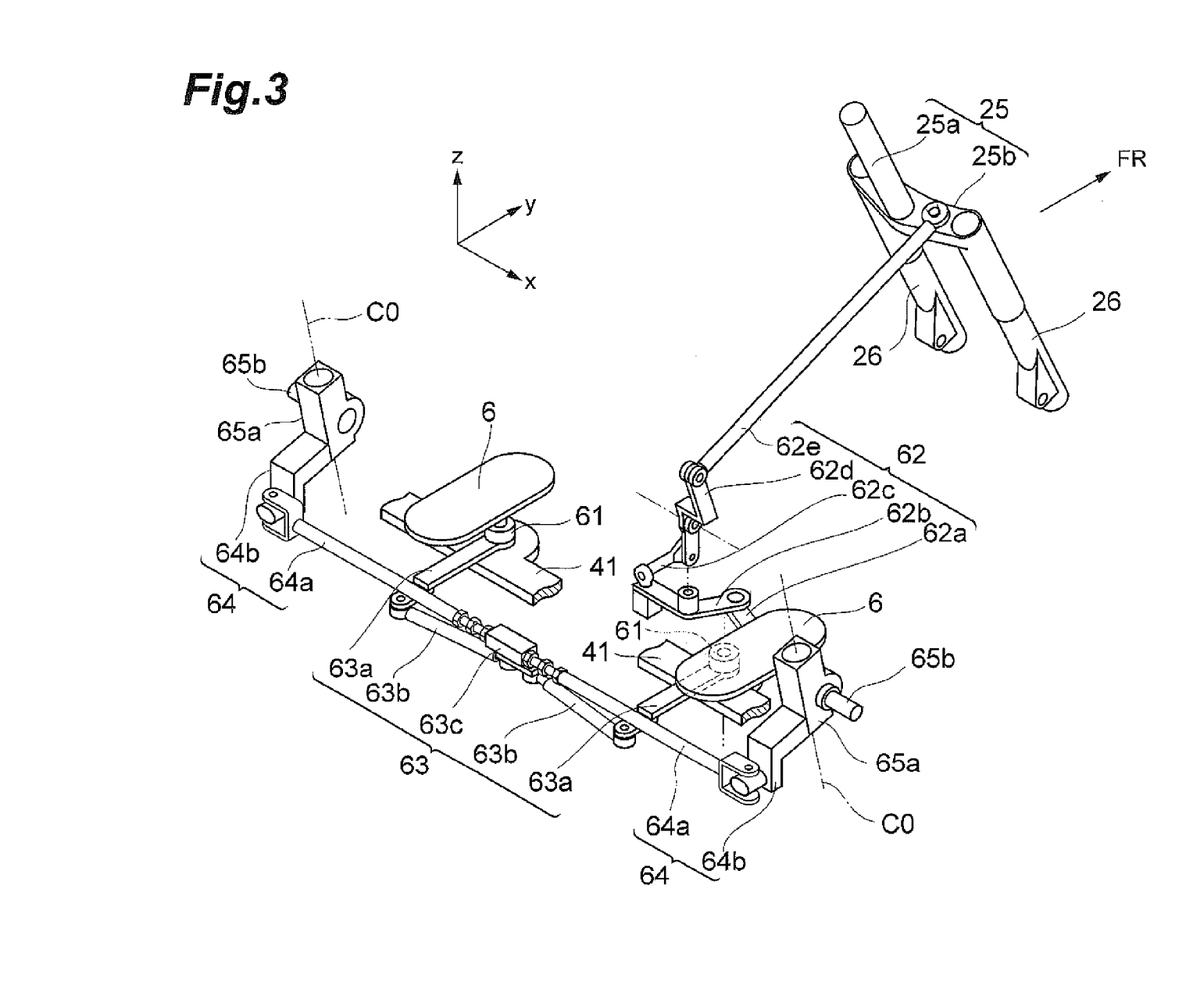
FIG. 3 is a perspective view illustrating steering effort transfer mechanisms of the vehicle of FIG. 1.
Figure 4:
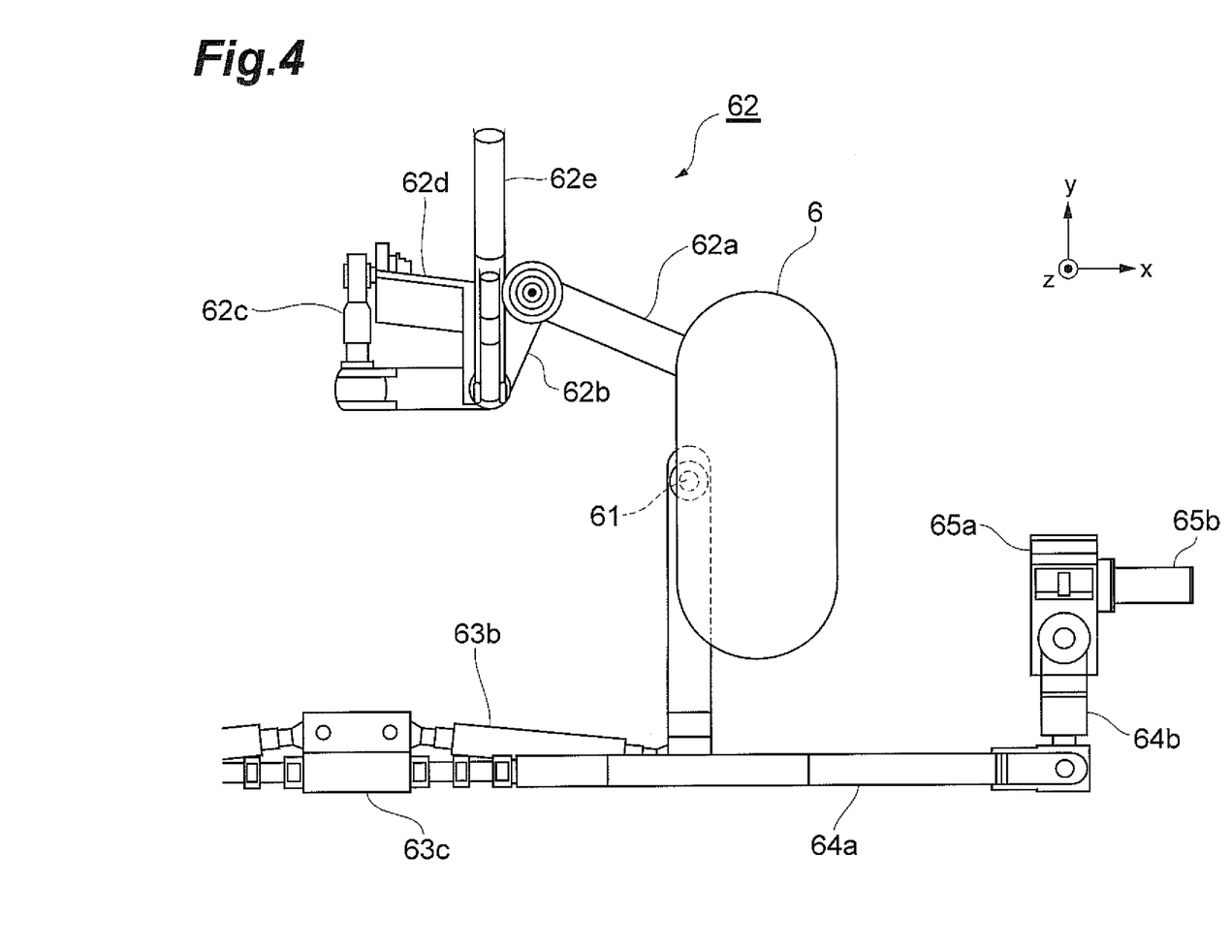
FIG. 4 is a top view illustrating the steering effort transfer mechanisms of the vehicle of FIG. 1.

FIG. 3 is a view for explaining the foot placement sections 6 and a front wheel steering effort transfer mechanism 62. FIG. 4 is a view when the front wheel steering effort transfer mechanism 62 is viewed from the plane.

The foot placement sections 6 are provided so as to be rotatable by moving the feet of the driver D, and the vehicle 1 may be steered to the left or the right by the rotation of the foot placement sections 6. In other words, the foot placement sections 6 are provided so as to be rotatable by moving the feet of the driver D, and the vehicle 1 during traveling may turn to the left or the right, namely, in the left direction or the right direction. That is, each of the foot placement sections 6 functions as a steering operation section or steering pedal of the vehicle 1. For example, the foot placement section 6 is sized suitable for placement of the foot of the driver D, and has a shape which is long in the forward and rearward direction of the vehicle 1. For example, the foot placement section 6 is provided so as to be rotatable about the vertical direction. Thereby, the foot placement section 6 rotates in such a manner that the driver D twists the foot, and the vehicle 1 may be steered or turned to the left or the right by the rotation motion.

Although a case in which the foot placement section 6 is rotated by twisting the foot of the driver D has been described herein, the foot placement section 6 may also be rotated by movement of the foot instead of the twisting of the foot, or the rotation motion may also be realized by rotatably moving the foot placement section 6 in a circular arc form. In addition, the foot placement section 6 has a smooth upper surface in FIG. 3, but the foot placement section 6 may also have an irregular upper surface in the vertical direction. In this case, the foot of the driver D may be suppressed from sliding on the foot placement section 6. In addition, an outer peripheral portion of the foot placement section 6 may also be provided with a protrusion section or projection section protruding upward. In this case, the foot of the driver D may be suppressed from shifting from the upper portion of the foot placement section 6.

The foot placement section 6 is mounted to the associated lower arm 41 through an axial support section 61 disposed beneath the foot placement section 6, and is provided so as to be rotatable on the lower arm 41. The axial support section 61 is provided at the lower arm 41 and axially supports the foot placement section 6 such that the foot placement section 6 is rotatable about a vertical axial line.

The front wheel steering effort transfer mechanism 62 which transfers steering effort to the front wheel 23 is connected to one foot placement section 6. The front wheel steering effort transfer mechanism 62 is a mechanism which transfers steering effort to the front wheel 23 according to rotation of the foot placement section 6. In other words, when a steering operation for rotating a forward portion of the foot placement section 6 is performed such that the forward portion of the foot placement section 6 is directed to the right or the left, the front wheel steering effort transfer mechanism 62 functions as a steering effort transfer mechanism which transfers the steering effort to the steering mechanism 25 of the front wheel 23 according to the steering operation.

For example, the front wheel steering effort transfer mechanism 62 includes a first link member 62a, a second link member 62b, a third link member 62c, a fourth link member 62d, and a fifth link member 62e. The first link member 62a is a rod-shaped member, is mounted to the right foot placement section 6, and is provided so as to horizontally protrude from the right foot placement section 6 to the forward left side. The first link member 62a is moved integrally with the foot placement section 6 and rotatably moved along with rotational movement of the foot placement section 6. The second link member 62b is a member having a bent shape, and an end portion thereof is rotatably mounted to a tip portion of the first link member 62a. A bent portion at an intermediate position of the second link member 62b is axially and rotatably supported by the lower arm 41. Thereby, the second link member 62b has a structure in which the other end portion thereof moves in the forward and rearward direction of the vehicle 1 by the rotational movement of the foot placement section 6. The third link member 62c is a rod-shaped member, an end portion thereof is rotatably mounted to a rear end of the second link member 62b, and the other end portion thereof is rotatably mounted to a lower end of the fourth link member 62d. The third link member 62c is arranged in the forward and rearward direction of the vehicle 1 and moves in the forward and rearward direction according to movement of the end portion of the second link member 62b in the forward and rearward direction. An end portion of the third link member 62c connected to the second link member 62b is formed with a ball joint, and is rotatable relative to the end portion of the second link member 62b. For example, a rotation coupling portion between the second link member 62b and the third link member 62c is located on a shaft of rotation mounting between the lower arm 41 and the main body 3 in the forward and rearward direction of an axial line C1 thereof to be described later. By using such a ball joint arrangement structure, it may be possible to absorb an influence caused by twisting between a mechanism at the foot placement section 6 and a mechanism at the front wheel 23 when the vehicle 1 is inclined inward during turning. The fourth link member 62d is a member having a bent shape and is disposed in the vertical direction. A bent portion at an intermediate position of the fourth link member 62d is axially supported so as to be rotatable relative to the main body 3. Consequently, by forward and rearward movement of the third link member 62c, a lower end of the fourth link member 62d moves in the forward and rearward direction of the vehicle 1, and the other upper end thereof moves so as to be close to or away from the steering mechanism 25 of the front wheel 23. An end portion of the fifth link member 62e is rotatably mounted to the upper end of the fourth link member 62d. The fifth link member 62e is a rod-shaped member, and the other end portion thereof is rotatably mounted to the horizontal member 25b of the steering mechanism 25. Thereby, the fifth link member 62e moves in a longitudinal direction and the steering effort is transferred to the steering mechanism 25 and the front wheel 23, according to movement of the fourth link member 62d.

As shown in FIG. 3, an interlocking mechanism 63 is provided between the right foot placement section 6 and the left foot placement section 6. The interlocking mechanism 63 is a mechanism which interlocks movement of the right foot placement section 6 and the left foot placement section 6. For example, the interlocking mechanism 63 is a mechanism which rotates the left foot placement section 6 in the right direction when the right foot placement section 6 is rotated in the right direction. For example, the interlocking mechanism 63 includes first link members 63a, second link members 63b, and a third link member 63c. The first link members 63a are each a rod-shaped member, and are respectively mounted to the right foot placement section 6 and the left foot placement section 6 one by one. For example, each of the first link members 63a is provided so as to protrude rearward from the associated foot placement section 6, moves integrally with the foot placement section 6, and rotates along with rotational movement of the foot placement section 6. An end portion of each second link member 63b is rotatably mounted to a rear end of the associated first link member 63a. The second link member 63b is a rod-shaped member, and is disposed in a width direction of the vehicle 1. The second link member 63b moves in the vehicle width direction according to the rotational movement of the first link member 63a. The third link member 63c is mounted to the other end portion of the second link member 63b.

The third link member 63c is a block-shaped member and is provided at a central position of the vehicle 1 in the width direction thereof. The third link member 63c functions as a coupling member which couples the right second link member 63b to the left second link member 63b. The third link member 63c transfers transmission power from the right second link member 63b to the left second link member 63b, and transfers transmission power from the left second link member 63b to the right second link member 63b.

The interlocking mechanism 63 forms a parallel crank mechanism with two first link members 63a, two second link members 63b, and the third link member 63c, and interlocks rotation motion of the right foot placement section 6 and the left foot placement section 6. In addition, as a mechanism for interlocking movement of the right foot placement section 6 and the left foot placement section 6, other mechanisms may also be used instead of the above interlocking mechanism 63.

As shown in FIG. 3, wheel steering effort transfer mechanisms 64 are provided to transfer steering effort of the foot placement sections 6 to the right and left wheels 2R and 2L. The wheel steering effort transfer mechanisms 64 are mechanisms which transfer steering effort to the right and left wheels 2R and 2L according to rotation of the foot placement sections 6. In other words, when a steering operation for rotating the forward portions of the foot placement sections 6 is performed such that the forward portions of the foot placement sections 6 are directed to the right or the left, the wheel steering effort transfer mechanisms 64 function as steering effort transfer mechanisms or side wheel steering effort transfer mechanisms which transfer steering effort to the right and left wheels 2R and 2L according to the steering operation. The right and left wheels 2R and 2L function as steering wheels or turning wheels of the vehicle 1. That is, the right and left wheels 2R and 2L are turned when the steering effort is transferred to the right and left wheels 2R and 2L by the wheel steering effort transfer mechanisms 64, and thus the vehicle 1 may be turned.

For example, each of the wheel steering effort transfer mechanisms 64 includes a first link member 64a and a second link member 64b. The first link member 64a and the second link member 64b are provided to transfer steering effort to each of the right and left wheels 2R and 2L. The first link member 64a is a rod-shaped member, and an end portion thereof is mounted to the third link member 63c of the interlocking mechanism 63. The other end portion of the first link member 64a is rotatably mounted to the second link member 64b. The second link member 64b has a bent shape, and is mounted to an axle housing 65a. The axle housing 65a is a housing member which houses an axle 65b as a shaft of the right or left wheel 2R or 2L. A lower portion of the axle housing 65a is rotatable about an axial line in the forward and rearward direction relative to the associated lower arm 41, and is mounted so as to be rotatable about a steering axial line C0 having a positive caster angle. An upper portion of the axle housing 65a is rotatable about the axial line in the forward and rearward direction relative to the associated upper arm 42, and is mounted so as to be rotatable about the steering axial line C0 having a positive caster angle.

In the wheel steering effort transfer mechanism 64, when the third link member 63c moves according to the steering operation of each foot placement section 6, each of the first link members 63a and 63a moves in the vehicle width direction. Through movement of the first link member 63a, the axle housing 65a and the axle 65b rotate about the steering axial line C0 through the associated second link member 63*b*, and thus the right and left wheels 2R and 2L are turned.

Figure 5:
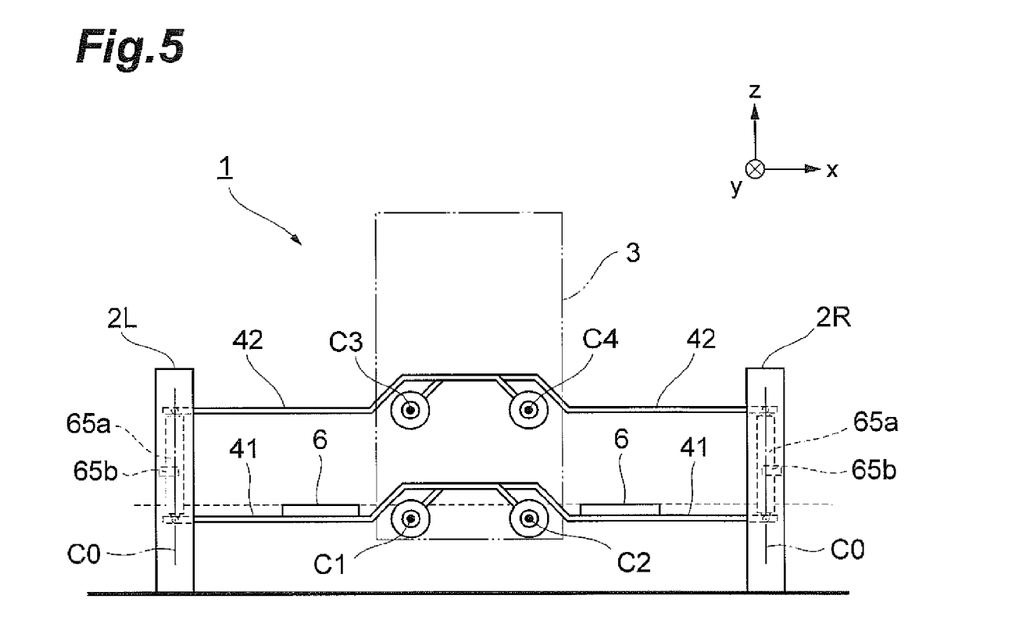
FIG. 5 is a view for explaining a mounting structure of lower arms of the vehicle of FIG. 1.
Figure 6:
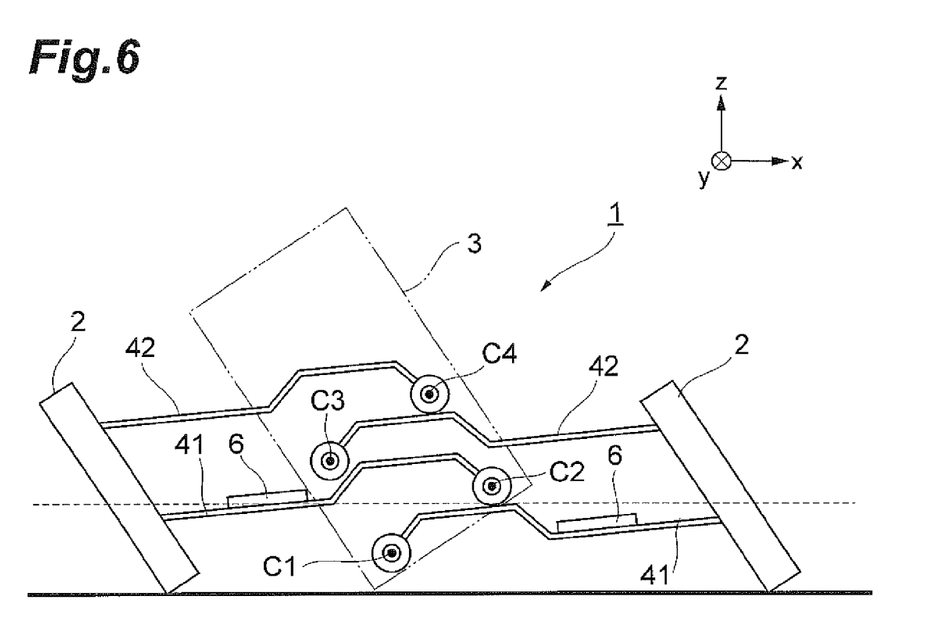
FIG. 6 is a view for explaining a state in which the vehicle of FIG. 1 is turned.

FIGS. 5 and 6 are schematic views for explaining the lower arms 41 and the upper arms 42 of the vehicle 1.

FIG. 5 is a view schematically illustrating a mounting structure of the lower arms 41 and the upper arms 42 when the vehicle 1 is viewed from the back. FIG. 6 is a view schematically illustrating a state of the lower arms 41 and the upper arms 42 when the vehicle 1 is turned.

As shown in FIG. 5, the right lower arm 41 and the left lower arm 41 are mounted to the main body 3. A mounting position (axial line C1) of the right lower arm 41 to the main body 3 is to the left of a mounting position (axial line C2) of the left lower arm 41, and the mounting position (axial line C2) of the left lower arm 41 to the main body 3 is to the right of the mounting position (axial line C1) of the right lower arm 41. For example, the mounting position of the right lower arm 41 to the main body 3 is to the left of the main body 3 and the mounting position of the left lower arm 41 to the main body 3 is to the right of the main body 3. Specifically, the right lower arm 41 is mounted so as to be rotatable about the axial line C1 extending in the forward and rearward direction of the vehicle 1, the left lower arm 41 is mounted so as to be rotatable about the axial line C2 extending in the forward and rearward direction of the vehicle 1, and the axial line C1 is set to be to the left of the main body 3 from the axial line C2. The right or left wheel 2R or 2L is mounted to an end portion of the associated lower arm 41 extending outward from the main body 3 so as to be rotatable about an axial line extending in the forward and rearward direction. For example, the axle housing 65*a* is mounted to an outer end portion of the associated lower arm 41 so as to be rotatable about the axial line extending in the forward and rearward direction and rotatable about the steering axial line C0. The axle 65*b* is mounted to the axle housing 65*a* so as to be rotatable about an axial line extending in the vehicle width direction and the right or left wheel 2R or 2L is mounted to the axle 65*b*.

Each of the upper arms 42 is arranged at an upward position of the associated lower arm 41 in parallel with the lower arm 41. The right upper arm 42 and the left upper arm 42 are mounted to the main body 3. A mounting position of the right upper arm 42 to the main body 3 is to the left of the main body 3, and a mounting position of the left upper arm 42 to the main body 3 is to the right of the main body 3. That is, the mounting position of the right upper arm 42 to the main body 3 is to the left of the mounting position of the left upper arm 42, and the mounting position of the left upper arm 42 to the main body 3 is to the right of the mounting position of the right upper arm 42. Specifically, the right upper arm 42 is mounted so as to be rotatable about an axial line C3 extending in the forward and rearward direction of the vehicle 1, the left upper arm 42 is mounted so as to be rotatable about an axial line C4 extending in the forward and rearward direction of the vehicle 1, and the axial line C3 is set to be to the left of the main body 3 from the axial line C4. The right or left wheel 2R or 2L is mounted to an end portion of the associated upper arm 42 extending outward from the main body 3 so as to be rotatable about an axial line extending in the forward and rearward direction. For example, the axle housing 65*a* is mounted to an outer end portion of the associated upper arm 42 so as to be rotatable about the axial line extending in the forward and rearward direction and rotatable about the steering axial line C0.

As shown in FIG. 6, when the vehicle 1 is turned to the left, the main body 3 and the right and left wheels 2R and 2L are inclined toward an inner side in a turning direction. In this case, the right lower arm 41 connected to the right wheel 2R is rotatably mounted to the left of the main body 3, and the left lower arm 41 connected to the left wheel 2L is rotatably mounted to the right of the main body 3. Thereby, the left lower arm 41 at the inner side in the turning direction is suppressed from moving downward, and the right lower arm 41 at the outer side in the turning direction is suppressed from moving upward. Consequently, when the vehicle 1 is turned, a significant variation in height position between the left and right lower arms 41 and 41 is suppressed, and a significant variation in height position between the left and right foot placement sections 6 and 6 is suppressed. Furthermore, the driver D which is on board tends to obediently apply the load to a falling-side foot by raising the falling-side foot in a case of assuming vertical balance of minute low speed in which traveling inertial force is small or the like, and the main body 3 is easily restored (self-centered) in the vertical direction. Even during turning, an inward inclination angle is easily controlled through load movement of both feet of the driver D and driving operability is improved.

Figure 7:
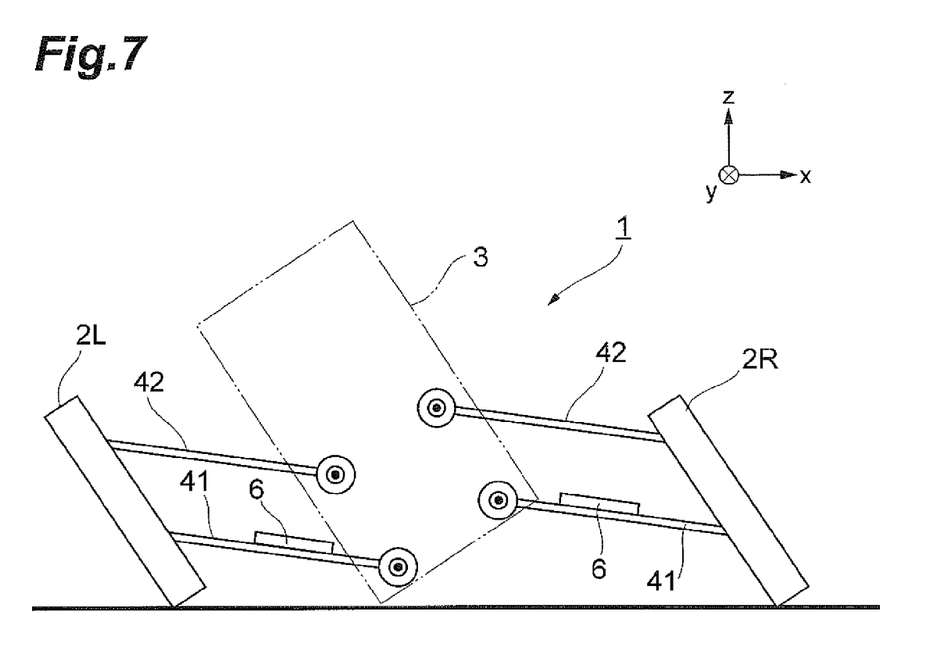
FIG. 7 is a view for explaining a comparative example to the vehicle of FIG. 1.

As shown in FIG. 7, if the right lower arm 41 connected to the right wheel 2R is mounted to the right of the main body 3 and the left lower arm 41 connected to the left wheel 2L is mounted to the left of the main body 3, the left lower arm 41 at the inner side in the turning direction is significantly moved downward and the right lower arm 41 at the outer side in the turning direction is significantly moved upward. Consequently, when the vehicle 1 is turned, a height position significantly differs between the left and right lower arms 41 and 41 and a height position significantly differs between the left and right foot placement sections 6 and 6. Furthermore, when the driver D which is on board obediently applies the load to the falling-side foot by lowering the falling-side foot in a case of assuming vertical balance of minute low speed in which traveling inertial force is small or the like, the driver D is further tilted. For this reason, the main body 3 cannot be restored in the vertical direction unless the load is applied to the opposite foot. However, since this movement is very unnatural to humans having a high height of gravitational center, the control thereof is substantially very difficult. Accordingly, it is difficult to achieve high driving operability since the feet of the driver D is in an unstable state during turning.

In addition, the foot placement section 6 may also be provided on the upper arm 42 according to a mounting structure of arm members of the lower arm 41 and the upper arm 42. In addition, as the right and left arm members, the upper arm 42 may also be used instead of the lower arm 41. In addition, the upper arm 42 may not also be installed among the lower arm 41 and the upper arm 42.

Figure 8:
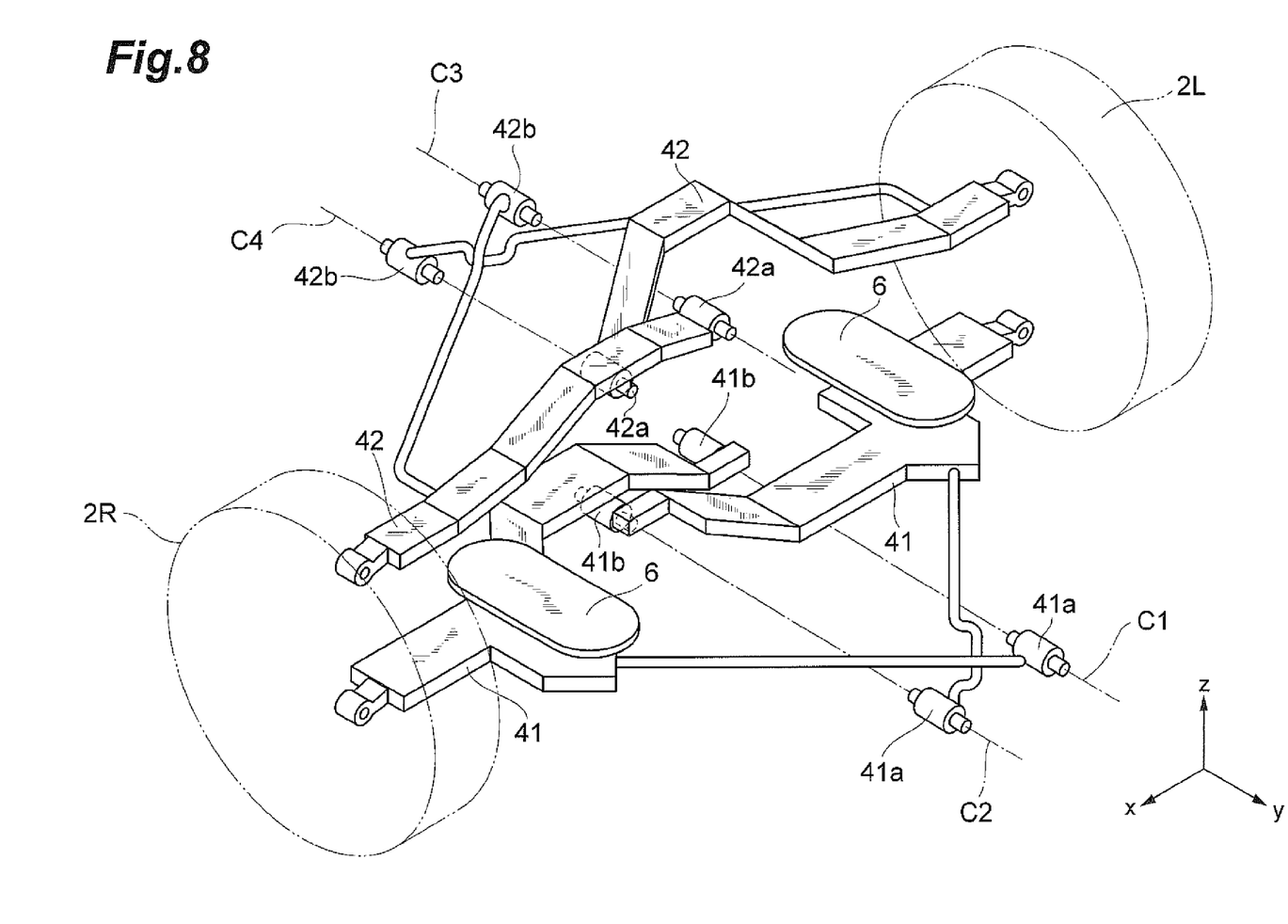
FIG. 8 is a view schematically illustrating a mounting structure between lower arms and upper arms in the vehicle of FIG. 1.

FIG. 8 shows a specific example of the lower arms 41 and the upper arms 42. Each lower arm 41 is provided in the horizontal direction and includes two end portions 41*a* and 41*b* formed by branching of a portion of the lower arm 41 at the main body 3 side. The end portions 41*a* and 41*b* of the right lower arm 41 are mounted so as to be rotatable about the same axial line C1. In addition, the end portions 41*a* and 41*b* of the left lower arm 41 are mounted so as to be rotatable about the same axial line C2. The axial line C1 is positioned to the left of the vehicle 1 from the axial line C2. Since the two end portions 41*a* and 41*b* are provided at the main body 3 side of the lower arm 41, mounting strength of the lower arm 41 to the main body 3 may be enhanced.

Each upper arm 42 is provided in the horizontal direction and includes two end portions 42*a* and 42*b* formed by branching of a portion of the upper arm 42 at the main body 3 side. The end portions 42*a* and 42*b* of the right upper arm 42 are mounted so as to be rotatable about the same axial line C3. The end portions 42*a* and 42*b* of the left upper arm 42 are mounted so as to be rotatable about the same axial line C4. The axial line C3 is positioned to the left of the vehicle 1 from the axial line C4. Since the two end portions 42a and 42b are provided at the main body 3 side of the upper arm 42, mounting strength of the upper arm 42 to the main body 3 may be enhanced. The main body 3 is configured to be inclined to the left and the right with respect to the lower arm 41 and the upper arm 42 by rotatably mounting the lower arm 41 and the upper arm 42 to the main body 3.

Next, a boarding posture of the vehicle 1 according to the embodiment will be described.

In FIG. 1, the driver D boards the vehicle 1 and straddles the seating section 5 to sit on the seating section 5. In this case, the legs of the driver D are lowered downward from the seating section 5 and the feet of the driver D are placed on the foot placement sections 6 provided beneath the seating section 5. The boarding posture of the driver D is a posture in which the head, the waist, and the feet of the driver D are positioned in a nearly straight line in the vertical direction, and is a so-called horseback riding posture or a posture similar to the horseback riding posture. For this reason, a main point of the upper body portion of the driver D affected by gravity (for instance, a lumbar vertebra) and a main point of a seat surface reaction (for instance, a portion around a hip-bone) nearly coincide with each other, and retroversion moment by hamstring muscles of the leg portion is not generated in the pelvis. Accordingly, the retroversion of the pelvis of the driver D due to seating is suppressed and the seating posture is suppressed from being a stooped posture. Therefore, influences of the stooped posture regarding health (for instance, shoulder discomfort, lumbago, depressive condition, etc) may be suppressed and a good healthy driving posture of the driver D may be assumed.

In addition, since the spine of the driver D may be straightened by assuming the boarding posture, there is no need to provide a lumbar support which supports the lumbar vertebra portion of the driver D from the back. Accordingly, the cost and weight of the vehicle 1 are reduced.

In addition, in the boarding posture, the legs of the driver D are lowered downward from the waist portion. Thereby, the retroversion moment by the hamstring muscles of the leg portion is not generated in the pelvis and the retroversion of the pelvis is prevented. Therefore, the spinal cord of the driver D may be in good condition and an ideal state may be realized in spiritual and physical aspects of the driver D. In addition, in such a boarding posture, the spine is straightened, blood flow is good, and blood easily flows into the brain of the driver D. For this reason, a function of the brain of the driver D may be suppressed from deteriorating and thus driving determination may be properly performed.

In addition, in such a boarding posture, since the upper body of the driver D is vertically straightened, vibration such as pitching and rolling generated in the vehicle 1 may be suppressed from being directly transferred to the driver D. For example, when vibration such as pitching and rolling is generated in the vehicle 1, the vibration may be suppressed from being transferred to the upper body and head portion of the driver D by moving the waist and the like of the driver D.

Next, a driving operation of the vehicle 1 according to the embodiment will be described.

As shown in FIG. 1, the driver D grips the grip section 27a with the hand in order to perform the driving operation in a state of boarding the vehicle 1. When the acceleration operation is performed by inclining and tilting the grip section 27a in the forward direction, the in-vehicle power source (not shown) is operated according to an acceleration operation amount of the grip section 27a and the vehicle 1 travels forward by rotatably driving the rear wheel 24, the front wheel 23, or the wheels 2. In this case, since the grip section 27a is provided at a position at which the driver D stretches an arm and grips the grip section 27a with the hand, the driver D performs the driving operation while maintaining the horseback riding posture. When the driver D returns the grip section 27a to an original position, namely, to a neutral position, the provision of the driving force by the power source is stopped and the vehicle 1 is in a state of traveling by inertia. When the driver D inclines and tilts the grip section 27a in the rearward direction, the deceleration operation is performed, the brake hydraulic pressure from the operation section 27 is transferred to the brake device (not shown), and the braking is performed according to a deceleration operation amount of the grip section 27a.

When the driver D further moves or tilts the grip section 27a in the rearward direction from a stopped state of the vehicle 1, the in-vehicle power source, namely, a drive section is operated and the vehicle 1 is moved in reverse by reverse rotation of the rear wheel 24, the front wheel 23, or the wheels 2. As such, the vehicle 1 may travel forward or be moved in reverse by moving the grip section 27a in an intended direction. For this reason, since the vehicle 1 travels forward or is moved in reverse according to intuition of the driver D, the driving operation of the vehicle 1 may be easily performed. In addition, it may be possible to suppress erroneous operation of the vehicle 1.

In addition, in the vehicle 1 according to the embodiment, the acceleration operation is performed by tilting the grip section 27a in the forward direction and the deceleration operation is performed by tilting the grip section 27a in the rearward direction. Thereby, in order to perform such an acceleration and deceleration operation, it is necessary to tilt the grip section 27a in the forward or rearward direction by moving the upper body in the forward and rearward direction by the driver D and the acceleration and deceleration operation is performed using body muscular strength of the driver D. For this reason, a healthy driving operation may be performed.

In addition, when vibration due to pitching and rolling is generated in the vehicle 1 during traveling of the vehicle 1, the vibration may be suppressed from being transferred to the upper body and head portion of the driver D by moving the waist and the like of the driver D as described above. In this case, a posture change is performed using body muscular strength of the driver D.

Figure 9:
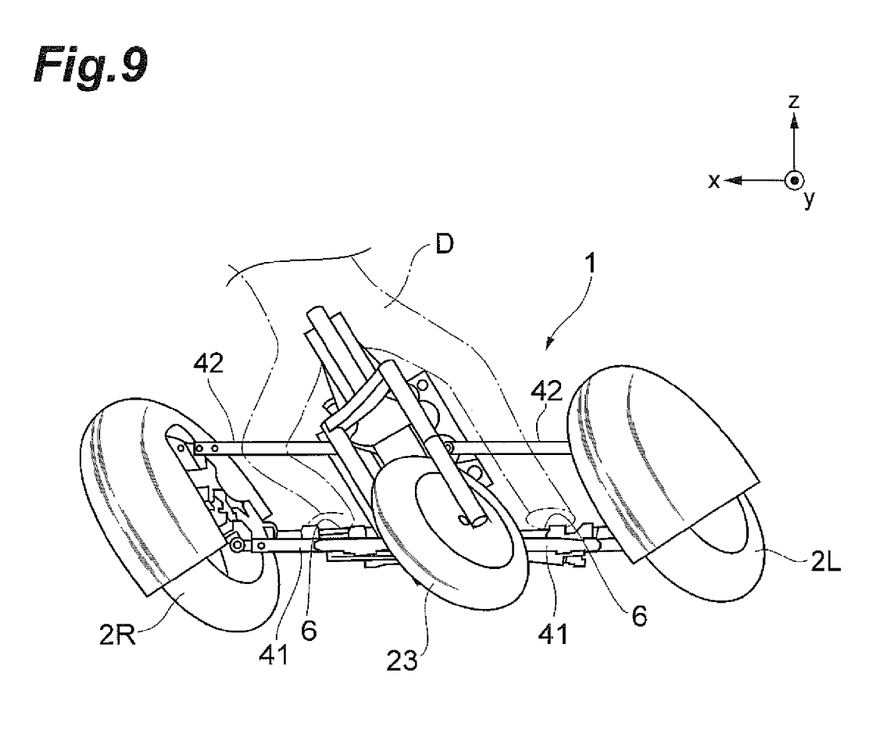
FIG. 9 is a view for explaining a driving operation of the vehicle of FIG. 1.

A turning operation of the vehicle 1 is performed as follows. As shown in FIG. 9, first, the main body 3 is inclined to the inner side in the turning direction in such a manner that the driver D keeps or kicks the feet placed on the foot placement sections 6. In this case, since the foot placement sections 6 are not mounted to the main body 3 but mounted to the lower arms 41 at lateral sides of the main body 3, the inside portion of the main body 3 receives force in the downward direction by keeping or kicking the foot at the outer side in the turning direction in the downward direction, and roll moment in a direction in which the inward inclination is encouraged is generated around the axis of the main body 3 in the forward and rearward direction. Thus, a posture inclined inward in the turning direction may be assumed by small force and the main body 3 of the vehicle 1 may be easily inclined. If the foot placement sections 6 are mounted to the main body 3, lateral force is not added to the main body 3 even though the feet placed on the foot placement sections 6 are kicked and thus it is difficult to incline the main body 3. On the other hand, since the feet of the driver D are placed on the foot placement sections 6 provided on the lower arms 41 in the vehicle 1 according to the embodiment, the main body 3 may be easily inclined in the lateral direction and fine inclination adjustment may be easily performed. Meanwhile, since inside the lower arm 41 which retains the foot at the inner side in the turning direction has a mounting point at the outer side in the turning direction, the lower arm 41 is raised upward by the inward inclination of the main body 3 during turning, and roll moment in a direction in which an inward inclination roll angle is small may be provided around the axis of the main body 3 in the forward and rearward direction by moving the foot in the downward direction. Thereby, the balance of the vehicle 1 is assumed by means of usual behavior of humans, namely, by keeping the feet close to the ground inclined inward when the driver changes the turning posture and the driver nearly falls down by disturbance.

The driver D twists the feet to rotate the foot placement sections 6, thereby transferring steering effort to the front wheel 23 and the right and left wheels 2R and 2L according to the rotation motion. Thereby, the front wheel 23 and the right and left wheels 2R and 2L are turned and the turning operation may be performed in a desired direction. In the turning operation, since ground load reaction moment of steering rotation having a positive caster angle is changed by inward inclination of the main body 3 and the front wheel 23 and the right and left wheels 2R and 2L are turned, a certain turning operation may be performed and fine steering adjustment may be performed by rotation of the foot placement sections 6.

In addition, as shown in FIG. 6, when the vehicle 1 is turned, the lower arm 41 at the inner side in the turning direction is suppressed from moving downward, and the lower arm 41 at the outer side in the turning direction is suppressed from moving upward, thereby allowing a variation in height position between the left and right lower arms 41 and 41 to be significantly suppressed. For this reason, a variation in height position between the left and right foot placement sections 6 and 6 is significantly suppressed. Furthermore, the driver D which is on board tends to obediently apply the load to the falling-side foot by raising the falling-side foot in a case of assuming vertical balance of minute low speed in which traveling inertial force is small or the like, and the main body 3 is easily restored (self-centered) in the vertical direction. Even during turning, an inward inclination angle is easily controlled through load movement of both feet of the driver D. Accordingly, the feet of the driver D are in a stable state during turning and driving operability is improved.

The turning operation may be performed in such a manner that the driver D turns the waist and the feet in an intended turning direction. Accordingly, since the turning operation is performed according to intuition, no erroneous operation is generated. In addition, since the driver D moves the feet and performs a steering operation, it may be possible to perform the steering operation using the leg muscles used in everyday life. For this reason, it may be possible to suppress the atrophy of the leg muscles of the driver D. Furthermore, in a driving posture in which the head, waist, and feet of the driver D are positioned in a nearly straight line in the vertical direction, the weight of the driver D is facilitated so as to be put on the feet and the steering operation according to keeping, kicking, and twisting of the feet is easily performed. Accordingly, the leg muscles of the driver D may be effectively used in the steering operation or the turning operation.

As described above, the vehicle 1 according to the embodiment includes the seating section 5 configured such that the driver D may take a seat by straddling the same and the foot placement sections 6 provided at the left and right positions with the seating section 5 interposed therebetween. Thereby, the driver D has a posture in which the head, waist, and feet of the driver D are positioned in a nearly straight line in the vertical direction when the driver D sits on the seating section 5 and places the feet on the foot placement sections 6. For this reason, the retroversion of the pelvis of the driver D due to seating is suppressed and the seating posture is suppressed from being a stooped posture. Therefore, a good healthy driving posture may be assumed.

In addition, since the foot placement sections 6 are not disposed at the main body 3 but disposed at the lateral positions of the main body 3, the main body 3 may be easily inclined by keeping or kicking the feet placed on the foot placement sections 6. In addition, since the turning operation is performed by moving the feet placed on the foot placement sections 6 by the driver D, the turning operation may be performed using the leg muscles used in everyday life. For this reason, it may be possible to realize health promotion by stimulating the muscles through the turning operation. In addition, the atrophy of the leg muscles may be suppressed.

In the driving posture in which the head, waist, and feet of the driver D are positioned in a nearly straight line in the vertical direction, the weight of the driver D is facilitated so as to be put on the feet and the steering operation according to twisting of the feet is easily performed. Accordingly, the leg muscles of the occupant may be effectively used in the steering operation or the turning operation. Furthermore, the foot placement sections 6 are supported by the lower arms 41 connected to the right and left wheels 2R and 2L, a load is facilitated so as to be transferred to the right and left wheels 2R and 2L by keeping the feet on the foot placement sections 6, and preferable operability is achieved. As such, the driving operation using the leg muscles may be performed in a good driving posture and the healthy vehicle 1 may be provided.

In addition, the vehicle 1 includes the front wheel steering effort transfer mechanism 62 and the wheel steering effort transfer mechanisms 64 which transfer steering effort to the turning wheels, namely the front wheel 23 and the right and left wheels 2R and 2L, according to the rotation motion of the foot placement sections 6. Thereby, the steering effort may be transferred to turning wheels according to rotation of the foot placement sections 6 by moving the feet of the driver D and the vehicle may be surely turned.

In addition, according to the vehicle 1, the mounting position of the right lower arm 41 to the main body 3 is to the left of the main body 3, and the mounting position of the left lower arm 41 to the main body 3 is to the right of the main body 3. For this reason, when the main body 3 is inclined inward during turning of the vehicle 1, the mounting position of the lower arm 41 at the inner side in the turning direction is positioned at a higher position than the mounting position of the lower arm 41 at the outer side in the turning direction, and the position of the lower arm 41 at the inner side in the turning direction is suppressed from being lowered. Accordingly, the heights of the lower arm 41 at the inner side in the turning direction and the lower arm 41 at the outer side in the turning direction may be significantly suppressed from differing from each other and the placed heights of both feet of the occupant may be significantly suppressed from differing from each other. Consequently, driving operability during turning may be improved.

Furthermore, in the vehicle 1 according to the embodiment, the acceleration operation is performed by tilting the grip section 27a in the forward direction and the deceleration operation is performed by tilting the grip section 27a in the rearward direction. Thereby, in order to perform the acceleration and deceleration operation, it is necessary to tilt the grip section in the forward or rearward direction from the driving posture in which the head, the waist, the feet of the driver D are positioned in a nearly straight line. Therefore, body muscular strength may be utilized through the acceleration and deceleration operation, so that a healthy driving operation may be performed.

The above-mentioned embodiment is an exemplary embodiment which describes the vehicle according to the present invention, and the vehicle according to the present invention is not limited thereto. The vehicle according to the present invention may be modified into various forms on the basis of the spirit of the invention. In addition, various changes and modifications may be made without departing from the concept and scope of the invention as defined in the following claims.

What is claimed is:

1. A vehicle having a right wheel provided at the right of a main body and a left wheel provided at the left of the main body, the vehicle comprising:

a seating section configured such that an occupant is able to take a seat by straddling the same;
a right arm member that connects the main body to the right wheel;
a left arm member that connects the main body to the left wheel; and
foot placement sections that are respectively mounted to the right and left arm members in order to place feet of the occupant thereon,
wherein the main body is configured to be capable of being inclined to the left and the right with respect to the right and left arm members, and
a mounting position of the right arm member to the main body is to the left of the main body from a mounting position of the left arm member to the main body.

2. The vehicle according to claim 1, wherein the main body is configured such that a front wheel is mounted to a front portion and a rear wheel is mounted to a rear portion.

* * * * *